United States Patent Office 3,406,067
Patented Oct. 15, 1968

3,406,067
COLORED PHOTORESIST AND METHOD
OF PREPARATION
Edward Cerwonka, Binghamton, N.Y., assignor to GAF
Corporation, a corporation of Delaware
No Drawing. Filed July 6, 1965, Ser. No. 469,909
6 Claims. (Cl. 96—35.1)

ABSTRACT OF THE DISCLOSURE

Preparation of colored photoresists by incorporating in a photopolymerizable layer a relatively colorless color-generating reagent yielding a color upon mild oxidation, exposing to a light pattern, oxidizing and removing the unexposed portion of the layer.

The present invention relates to colored photoresists and methods for their preparation. It relates more particularly to colored photoresists which are prepared by exposing to actinic radiation an original light-sensitive coated layer which is relatively devoid of color, the color being developed by oxidation treatment after exposure. It has particular application to photoresists formed on a suitable support and comprising a polymerizable but originally nonoxidizing light-sensitive layer. Because of its being substantially uncolored, the sensitive layer is relatively free of unwanted spectral absorption when exposed to visible light. The exposed layer is one which can be developed and its final desired color brought out by simple techniques.

In the prior art, various methods have been proposed for preparing colored photoresists, e.g., for preparation of transfer elements, printing plates, and the like. Some of these contain dyes in color, which dyes are dispersed or dissolved in the formulation while the coating or emulsion is being prepared. When prepared in this way, there is commonly experienced a change in spectral absorption, due to the presence of the dye. This, of course, is objectionable as it causes a departure from true colors as the final image is produced.

Hence an object of the present invention is to avoid the difficulty just mentioned by providing a coating which, at the time of exposure, is not subject to any substantial degree to changes in spectral absorption. According to this invention, the coated or emulsion layer, which is polymerizable, the polymerization being promoted catalytically, is colorless or essentially so at the time of exposure. That is, when the emulsion layer is exposed to visible light, the dye precursor is as yet undeveloped in color and is essentially clear or color-free. Consequently the leuco dye causes no substantial change or abnormality in spectral absorption. The desired eventual color is developed by oxidizing the dye precursor which is a leuco dye.

It is obviously desirable that development of the latent image itself, along with development of color, be as simple as possible. Another object of the present invention, therefore, is to produce an easily processable photoresist and make available a simple developing procedure, both for picture development and color establishment.

A number of dyes, or dye precursors, are available which are suitable for the purposes of this invention. Chief among these are the leuco dyes of the phenazine, oxazine, thiazine and phenthiazine class. Unlike some other dyes, these do not require the use of very strong oxidizing agents, such as lead dioxide, for their color development. Some of the leuco dyes, such as those of the triphenyl methane series, for example, do require lead dioxide or similar strong metallic oxides. The necessity of using such oxidizing agents has obvious disadvantages and another object of this invention is to make their use unnecessary.

Of the suitable leuco dyes mentioned above, those particularly preferred for purposes of this invention are the leuco methylene blue and the leuco thionin dyes. Others of those listed above as being generally suitable, however, may also be used.

Since the advantages of this invention are best obtained when color development is deferred until after exposure of the emulsion to light, the emulsion itself should be of such nature, chemically, that oxidation of the dye, or dye precursor, does not take place permanently. A further object of this invention, then, is to choose ingredients for the photographic layer which do not oxidize the dye material until the exposure has been made. For this purpose it is normally preferred to use cellulosic types of emulsion base, rather than gelatinous types which have oxidizing tendencies.

The photoresists of this invention, and the methods or processes by which they are prepared, are particularly well suited to systems which make use of the principles of ferric salt catalysis in the photopolymerizable layer. As indicated above, these should not oxidize the dye prematurely, oxidation of the dye precursor to bring out the color being purposely deferred until after exposure. Hence a material such as ferrous ammonium sulfate in combination with a chelating agent (e.g., versene) is employed to chemically reduce the dye to its leuco form, the oxidizing ingredient, preferably hydrogen peroxide in dilute aqueous solution, being supplied later.

The invention will be more fully understood by detailed reference to the specific examples which follow:

Example 1

As a preliminary step towards the actual formulation of the coating or emulsion material, a solution of leuco methylene blue was prepared by use of the following ingredients:

Methylene blue _____ mg__ 37
Disodium versene (the disodium salt of ethylene diamine tetraacetic acid) _____ mg__ 500
Ferrous ammonium sulfate _____ mg__ 275
Water (deionized) _____ ml__ 20

After the ingredients were fully dissolved, the above solution was added to the following solution which is light-sensitive:

Hydroxy ethyl cellulose _____ g__ 2.5
Ferric ammonium oxalate _____ g__ 2.47
Amide solution, "A–5" (prepared by dissolving 180 grams acrylamide and 7 grams N,N'-methylenebisacrylamide in 120 grams deionized water) _____ ml__ 6.0
Water _____ ml__ 25.0

The resulting solution, which was gray-green in color, was coated on a paper base and dried under nitrogen. When dry, a sample of the coated paper was exposed through a negative for three seconds to a light from a 375 watt reflector lamp at a distance of sixteen inches. Up to this point there was no significant appearance of color.

The exposed paper strip was next immersed in an aqueous solution of hydrogen peroxide, 1% concentration. A pronounced blue color appeared in the coating. Subsequent washing under warm water (at 40° C.) removed the unpolymerized colored areas. A blue colored photoresist remained behind.

A sample of the same coated paper was exposed through a $\sqrt{2}$ step wedge. This was followed by treatment with the peroxide bath and subsequently by washing in warm water, as described in the preceding paragraph. A blue colored photoresist was obtained which was the image of the step wedge. The intensity of the blue dye varied with the depth of the photopolymer on the step wedge. This gave the appearance of a blue colored step wedge. The wedge image thus obtained extended as far as that step of the silver wedge which had an optical density of 1.38. This step corresponds to an exposure of three seconds when there is no neutral density filter between the light source (375 watt reflector lamp) and the exposed paper. Distance from light to sample is sixteen inches.

Example 2

The procedure of Example 1 was essentially repeated, substituting a leuco thionin dye for the methylene blue formula. The first solution was formulated as follows (leuco dye portion):

| | |
|---|---|
| Thionin _____ mg__ | 26 |
| Disodium versene (disodium salt of ethylene diamine tetraacetic acid) _____ mg__ | 500 |
| Ferrous ammonium sulfate _____ mg__ | 192 |
| Deionized water _____ ml__ | 20 |

This solution was added to the same light-sensitive ferric ammonium oxalate-cellulose and amide solution as was used in Example 1. The emulsion obtained was coated on paper as in Example 1 and was exposed and processed in the same manner, the exposed sheet being treated with hydrogen peroxide and washed to remove unpolymerized material. The resulting photoresist had a violet hue.

While the examples given above were coated on paper, they can also be placed on other bases including film, sheet aluminum or any other suitable support. The above examples employed hydroxyethylcellulose and such material, or equivalent cellulose derivatives, are preferred over ordinary gelatins. Even the so-called "inert" gelatins usually contain some oxidizing materials which react prematurely with the dye. Gelatin can be used, however, if suitable precautions are taken. In this case, larger proportions of ferrous salts are required to keep the dye in its reduced form until the proper time for its oxidation, i.e., after exposure.

While the leuco methylene blue and leuco thionin dyes are particularly suitable and are preferred, obviously their closely analogous counterparts in other colors may be used, provided that they are capable of simple and effective color development by mild oxidation treatment. Because of the ease and simplicity of using dilute hydrogen peroxide to bring out the color, it is much preferred to use those dyes which are readily susceptible to this treatment.

As for the other ingredients of the respective compositions, it will be obvious to those skilled in the art that equivalent materials and variants thereof may be substituted and that the specific proportions may be varied within reasonable limits. It is intended, in the claims which follow, to cover such variations and expedients as would readily occur to those skilled in the art and as are fairly within the spirit and scope of this invention, as broadly as the state of the prior art permits.

What is claimed is:
1. The process of preparing colored photoresists which comprises (a) incorporating into a photosensitive coating material which contains and is catalytically photopolymerizable by an iron salt a relatively uncolored dye precursor capable of developing by mild oxidation into an intense color, (b) exposing said material to visible light to form a latent image, (c) treating said material with a mild aqueous solution of hydrogen peroxide to develop said intense color, and (d) removing unexposed material to leave a colored image.

2. Process according to claim 1 wherein said dye precursor is selected from the class consisting of the leuco dyes of the phenazine, oxazine, thiazine and phenthiazine types.

3. Process according to claim 1 wherein said dye precursor is a leuco methylene blue.

4. Process according to claim 1 wherein said dye precursor is a leuco thionin.

5. Process according to claim 1 wherein said material contains a cellulosic base.

6. A light-sensitive photoresist material comprising, in combination a support sheet, and an emulsion layer on said base comprising a cellulosic photopolymerizable base, a ferrous salt, a light-sensitive ferric salt, and an essentially colorless leuco dye precursor capable of development into an intense color upon mild oxidation.

References Cited

UNITED STATES PATENTS

| 3,096,711 | 7/1963 | Ritzerfeld _____ 96—90 X |
| 3,130,050 | 4/1964 | Schwerin _____ 96—92 X |
| 3,157,501 | 11/1964 | Burrows et al. _____ 96—35.1 |
| 3,183,094 | 5/1965 | Cerwonka et al. _____ 96—92 |
| 3,252,412 | 5/1966 | Van Hoof _____ 96—35 X |

OTHER REFERENCES

Oster: "The Photochemistry of Dyes in Solution," 1953, Photographic Engineering, vol. 4, No. 3, pp. 174–176.

NORMAN G. TORCHIN, *Primary Examiner.*

R. E. MARTIN, *Assistant Examiner.*

Disclaimer 3,406,067.—*Edward Cerwonka*, Binghamton, N.Y. COLORED PHOTORESIST AND METHOD OF PREPARATION. Patent dated Oct. 15, 1968. Disclaimer filed Sept. 30, 1982, by the assignee, *Eastman Kodak Co.*

Hereby enters this disclaimer to all claims of said patent.

[*Official Gazette April 5, 1983.*]